Figure 1:
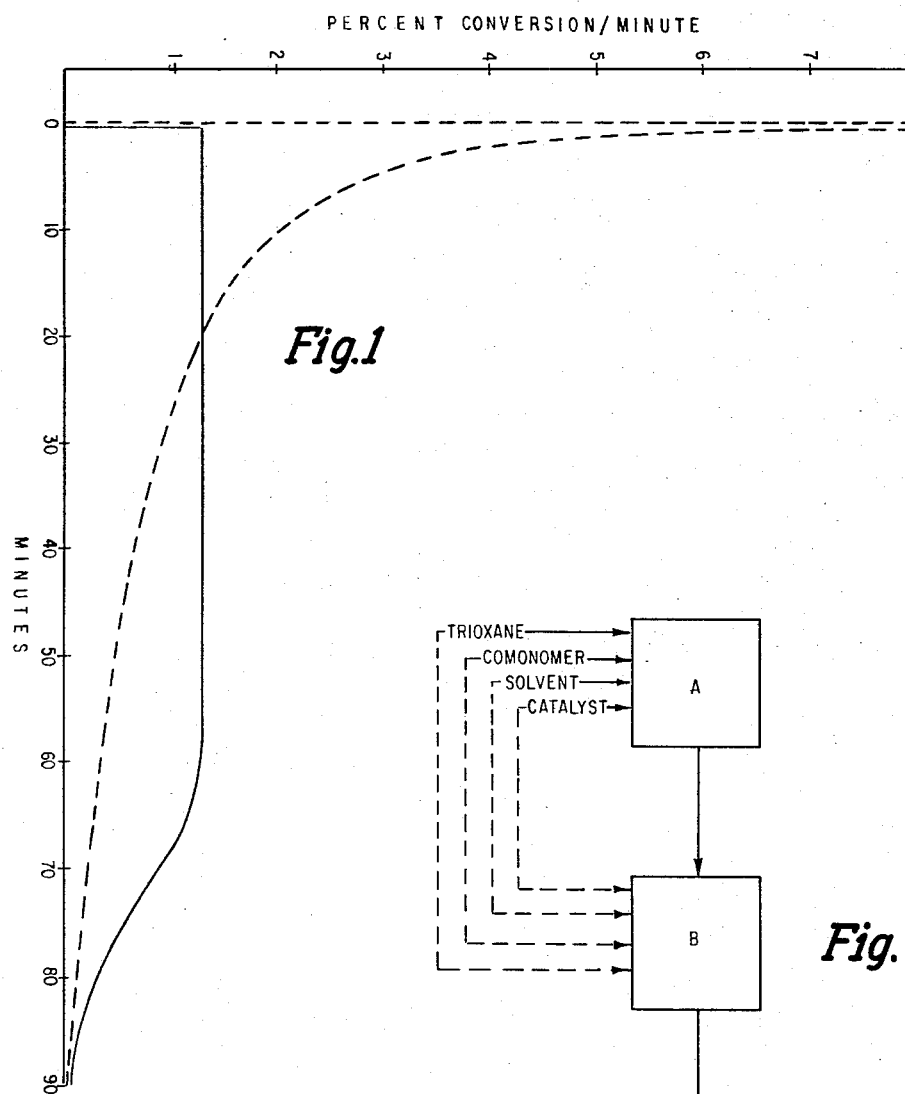

United States Patent Office 3,355,432
Patented Nov. 28, 1967

3,355,432
POLYMERIZATION OF TRIOXANE AND NORBORNADIENE
Kornel D. Kiss, University Heights, Ohio, assignor to Diamond Alkali Company, Cleveland, Ohio, a corporation of Delaware
Filed June 7, 1965, Ser. No. 461,843
12 Claims. (Cl. 260—73)

This invention relates to the preparation of thermoplastic compositions. More particularly, it relates to improvements in the production of oxymethylene copolymers having a high degree of thermal stability.

In copending application U.S. Ser. No. 449,271, filed Apr. 19, 1965, there is described a copolymer of excellent inherent thermal stability which is prepared from a mixture containing a major amount of trioxane and a minor amount of a norbornadiene monomer having the structural formula

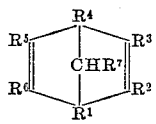

wherein $R^1$ to $R^7$ are each selected from the group consisting of hydrogen and lower alkyl radicals containing up to 4 carbon atoms with no more than one R being an alkyl radical. As set forth in Ser. No. 449,271, this copolymer is prepared in a batch-type process by contacting, optionally in the presence of a solvent or organic liquid reaction medium, the above described monomer mixture with a cationically-active catalyst, the said reaction being conducted generally at a temperature ranging from 30° to 100° C. for a time period of from 0.5 to 20 hours. Obtained consistently in comparatively high yields, the copolymer product contains from 0.1 to 10 mol percent of recurring units derived from the norbornadiene monomer, as determined by elemental analysis. It has an inherent viscosity of at least 0.7, which value corresponds to an average copolymer molecular weight of about 10,000. In order to have the most useful property levels, it is desirable that the copolymer product have an inherent viscosity value of at least 1.2 or an average copolymer molecular weight of about 30,000. However, in the process as described in Ser. No. 449,271 the copolymerization reaction rate, once initiated, is extremely high. Concomitant with the accelerated reaction rate and monomer conversion, there is a rapid increase in the viscosity of the reaction mixture, thus making it difficult to dissipate the exothermic heat of reaction efficiently therefrom. Accordingly, it has been difficult heretofore to prepare regularly and consistently copolymer products of the desired higher molecular weight. The above-described process also offers an additional disadvantage in that the copolymer product, as recovered from the reactor, is a solid mass which must first be ground, chopped or otherwise pulverized before it can be processed into finished plastic articles.

It is an object of this invention, therefore, to provide a process for the regular and reproducible production of high molecular weight, thermally stable copolymer products from trioxane and a norbornadiene monomer as described hereinabove.

It is another object of this invention to provide a process for the preparation of a copolymer of trioxane and the above described norbornadiene monomer whereby the said copolymer product, as recovered, is in particulate or powder form.

It is still another object to provide a process which may be operated continuously for the preparation of high molecular weight, thermally stable oxymethylene copolymer compositions from trioxane and the described norbornadiene monomer.

These and other objects will become apparent to those skilled in the art by a description of the invention which follows.

In general, the present invention involves the preparation of reproducible copolymers from trioxane and a norbornadiene monomer by carrying out the copolymerization reaction under prescribed conditions whereby the reaction rate is closely controlled, while simultaneously subjecting the copolymerizing mixture to shearing and blending so as to obtain the copolymer product in particulate or powder form.

The term "norbornadiene monomer" as used herein in the specification and claims and as represented by the structural formula hereinabove, is intended to refer to unsubstituted norbornadiene and to substituted norbornadienes having only one lower alkyl group attached to the norbornadiene ring. Substituted norbornadienes especially suitable for use are those substituted in the 2- and 4-positions of the norbornadiene ring, e.g., 2-methyl norbornadiene, 4-methyl-norbornadiene and the like. Because of its ready availability, unsubstituted norbornadiene monomer is at present preferred for use in the present invention. For this reason, specific references will be made hereinafter to this monomer. Such references are not to be taken, however, as limiting the present invention but merely as being illustrative thereof.

More specifically, the present invention encompasses a reproducible process for the preparation of high molecular weight, thermally stable trioxane-norbornadiene copolymer compositions in powder form, which process comprises charging to a jacketed reactor adapted to provide high shearing forces, trioxane, the norbornadiene monomer, a cationically-active catalyst and optionally a solvent or organic liquid reaction medium, the said reactants being employed in a prescribed ratio so that the copolymerization initiation period in the reaction mixture is generally from approximately 20 minutes to 1 hour, and preferably from 20 to 40 minutes. By "initiation period" is meant the time interval elapsing after addition of catalyst to the reaction mixture until insoluble copolymer formation therein is first observed. This time period may also be called the "induction period." At the same time, another jacketed reactor fitted with stirring apparatus and which is connected to the first described reactor and maintained at the same temperature, is charged with the same reaction ingredients. However, in this reactor these ingredients are employed in quantities sufficient to form soluble complexes between the catalyst and the monomers, but not to form insoluble copolymer in the same time period as described above. After charging of the ingredients, the reaction is allowed to proceed in both reactors, the mixture in the first reactor being simultaneously subjected to shearing and blending forces. For purposes of clarification, this reaction mixture is referred to hereinafter as the principal or primary reaction mixture. When initiation of the reaction in this first, principal mixture has been completed, as visually evidenced by the appearance of solid copolymer product and/or by a sharp sudden rise in the reaction temperature, the reaction mixture in the second reactor is added thereto either continuously or intermittently in prescribed amounts. After addition of the second reaction mixture has been completed, shearing and blending of the principal reaction mixture is continued until its consistency gradually changes from a suspension or slurry to a dry, predominantly granular product (at about 90 to 95 percent monomer conversion).

As mentioned earlier, the process for preparing trioxane-norbornadiene copolymers as described in Ser. No. 449,271 is characterized by an extremely high reaction rate when once initiated. In the process of this invention the reaction rate is reduced immediately upon initiation and is then substantially controlled throughout the reaction. In the accompanying graph illustrating copolymerization rate versus reaction time (FIGURE 1), the reaction rate of a typical process of this invention is represented by the continuous curve. The reaction rate of the copolymerization process as practiced heretofore and described in Ser. No. 449,271 is represented by the broken curve. In each process, the reaction ingredients were employed in a ratio whereby the induction period was similar, i.e., 30 minutes. This was accomplished by varying the catalyst level in the two reaction mixtures employed in the process of this invention. On the graph, the time period represented is the reaction time after the induction period. As shown on the graph, the reaction rate of the conventional process is extremely high when once initiated. It then diminishes rapidly so that after 30 minutes reaction time, the percent conversion is less than 1 percent per minute. In the process of this invention, the reaction rate initially is about 1.33 percent conversion per minute, and is maintained at this level during addition of the slow reacting mixture to the faster reacting principal copolymerization mixture.

In the process as practiced previously, the initially high reaction rate effects a rapid increase in the viscosity of the reaction mixture. In the controlled process described herein, the reaction mixture is maintained for a long period of time as an easily stirred, heavy suspension with good heat transfer characteristics and more of the comonomers are converted to a high molecular weight product. Accordingly, the copolymer product of this invention consistently has an inherent viscosity of 1.2 or above, in contrast to the variable products obtained heretofore in processes wherein less control of the reaction rate has been maintained. Inherent viscosity values are determined herein at 60° C., employing a solution containing 0.5 g. of the copolymer in 100 ml. of solution, the solvent being p-chlorophenol containing 2 percent alpha - pinene, by weight.

As previously described, the quantities of reactants employed in each of the copolymerization mixtures are selected so that the reaction proceeds to initiation at a much higher rate in the principal reaction mixture. In practice, the ratio of the reaction components employed in the principal reaction mixture is such that the induction period therein generally will be within 20 minutes to 1 hour and preferably within 20 to 40 minutes after the start of the reaction. Mixtures having the different reaction rates desired may be prepared by charging to each reactor similar quantities of the monomers and solvent (if solvent is employed), but different quantities of catalyst. Alternatively, such mixtures may be prepared by varying the norbornadiene concentration employed rather than the catalyst level. In a process wherein solvent is employed, mixtures having different reaction rates may be effected by varying the solvent concentration therein, while maintaining the monomer/catalyst ratios constant. It is to be understood, of course, that mixtures with different reaction rates also may be prepared by varying the solvent and/or monomer quantities as well as the catalyst level.

Figure 2:
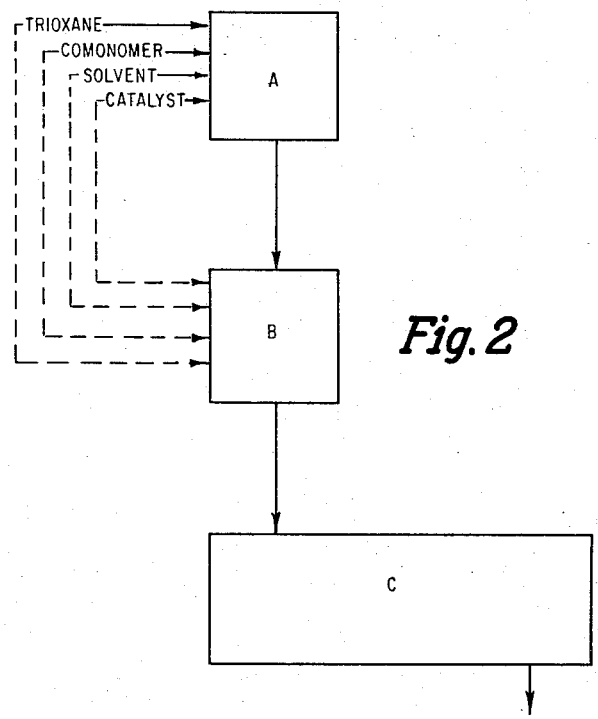

The copolymers may be conveniently prepared in a continuous operation as well as in a batch-type process, as described above. A typical continuous process is represented by the accompanying drawing (FIGURE 2). As illustrated in the drawing, three different interconnecting reactors (A, B and C) may be employed in the process. Usually, reactors A and B will be reactors such as glass-lined polymerization vessels equipped with adequate stirring apparatus, while reactor C is a heavy duty mixer of good heat transfer characteristics which is adapted to impart high shear to the reaction mixture. Suitable mixers of this type include, for example, the "Ko-Kneader," described in U.S. Patent 2,505,125 and the Twin-Screw Continuous Processor (manufactured by the Read Corporation). Reactors A and B likewise may be equipped with adduct lines for the addition of reaction components thereto. At the beginning of the process, reactors A and B each will be charged as in the batch process, i.e., reactor A will be charged with the reaction ingredients in quantities to provide a mixture having a low reaction rate, while reactor B will be charged with quantities of ingredients providing a mixture having a high reaction rate. Copolymerization then will be allowed to proceed in each reactor until the formation of solid copolymer is observed in the reaction mixture in reactor B. The mixture in reactor A then may be added to reactor B, while simultaneously feeding reaction components into reactor A in a prescribed ratio and at a prescribed rate so that the mixture therein will be maintained at a constant level and at liquid consistency. Concurrently, the copolymerizing mixture in reactor B which will be a heavy suspension or slurry will be transferred at a similar rate into reactor C. The volume of the mixture in reactor B may be maintained at a constant level by adding thereto the mixture from reactor A. During passage through reactor C, the mixture will be continuously subjected to shearing and blending, and as copolymerization progresses, will be transformed gradually from a heavy suspension into a dry, predominantly granular product.

Whether conducted continuously or intermittently as in a batch-type operation, the process of this invention generally may be carried out at a temperature ranging from 50° up to a maximum of 68° C. for a time period of from 0.5 to 10 hours. It is important that the temperature of the reaction mixture does not exceed 68° C. at any time during the reaction or copolymer products of lower, variable molecular weight will be produced. The criticality of the reaction temperature is described in a copending application filed of even date herewith in the names of Jerry T. Reed and Kornel D. Kiss. The reaction is preferably carried out at a temperature ranging from 60° to 68° C. for a total reaction time of from 1 to 5 hours. It is to be understood that this prescribed time period includes the induction or initiation period of the reaction as well as the time period after initiation. The reaction time after the induction period typically is from 0.5 to 4 hours.

Trace contaminants such as moisture in the reaction mixture have been found to substantially inhibit monomer conversion to the copolymer in good practical yields. Therefore, it is essential that the copolymerization process be conducted under substantially anhydrous conditions in an inert atmosphere. The reaction ingredients, i.e., the monomers or the monomers and solvent in combination, should contain no more than 100 p.p.m. and preferably no more than 50 p.p.m. of water. Likewise impurities in the monomers should be removed as completely as possible. In practice, the catalyst employed is prepared and then kept prior to use in a nitrogen atmosphere. The monomeric materials are advantageously dried prior to copolymerization by careful distillation over a dehydrating agent such as sodium and/or by dehydration process using a suitable absorbant such as molecular sieves, silica gel, etc. If employed, a liquid reaction medium may be dehydrated by standard distillation and drying methods.

The copolymerization reaction is effected in the presence of a cationically-active polymerization catalyst. Suitable compounds of this type include Lewis acids, e.g., metal halides, such as the halides of aluminum, boron, tin, titanium, zirconium, strontium, niobium and the like, and coordinate complexes of such metal halides with organic compounds where oxygen, nitrogen or sulfur is the donor atom. In practice, the coordination complexes of metal halides with organic compounds are most suitably employed with the coordinate complexes of boron trifluoride being especially preferred. Such boron trifluoride complexes may be, for example, a complex of boron trifluoride with an alcohol, a phenol, an acid, an ether, and acid anhydride, an ester, a ketone, an aldehyde, a dialkyl disulfide, a mercaptan and the like. Of these types, the boron trifluoride complexes with ethers such as diethyl ether, dibutyl ether and the like are especially preferred. In general, the particular catalyst employed in the over-all process may be used in amounts ranging from about 0.05 to about 10 millimols for each mol of trioxane employed. Preferably, from about 0.1 to about 3 millimols of catalyst per mol of trioxane is employed.

It should be pointed out, however, that in the process of this invention, the amount of catalyst required to prepare the desired copolymer product is substantially less than that required in the conventional copolymerization process as described in Ser. No. 449,271. In the copolymerization of trioxane with norbornadiene, a minimal concentration of catalyst is required to initiate the reaction within a prescribed time period. This catalyst level is more than sufficient to maintain a high reaction rate in the propagation phase of the reaction. Accordingly, in the conventional process, as soon as initiation in the reaction has been completed, there is an excess of catalyst which effects the extremely high reaction rate. In the process of this invention, on the other hand, a catalyst level required to initiate the copolymerization within the same time period as in the conventional process is employed only in the reaction mixture previously referred to herein as the primary mixture and which is a portion of the total reaction mixture employed in the process. When initiation has been completed in this primary reaction mixture, another mixture having a reduced catalyst concentration is added thereto, thus reducing the catalyst concentration in the total reaction mixture to a level whereby the reaction rate can be easily controlled. Accordingly, the over-all effect of the process of this invention is that the catalyst level employed is lower than that employed in the conventional process.

The copolymer products may be prepared by contacting the trioxane and norbornadiene monomer in the fluid state with the catalyst essentially in the absence of a solvent or other liquid reaction medium. However, copolymerization may be carried out in the presence of an anhydrous organic liquid which is a solvent for the monomers. Suitable solvents include aliphatic and cycloalphatic hydrocarbons, such as for example, hexane, heptane, cyclohexane, and the like. A concentration of solvent ranging up to 30 volume percent of the total reaction mixture may be employed.

Upon completion of the reaction, the granular copolymer product obtained is easily purified by leaching it with acetone or methanol, for example, to remove any unreacted monomers and/or occluded solvent remaining. After treatment, it is then dried under vacuum prior to being processed. Before use, the copolymer may be heated briefly at a temperature of 100° to 160° C. to decompose any unstable chain ends.

The copolymer products of this invention contain from 90 to 99.9 mol percent of recurring oxymethylene units and from 0.1 to 10 mol percent of recurring units derived from norbornadiene, as determined by elemental carbon-hydrogen analysis. These copolymers possess inherently a high degree of thermal stability. Thermal stability is measured by known thermogravimetric analytical techniques in a nitrogen atmosphere employing a Stanton Automatic Recording Thermobalance maintained at 220° C. When tested, the copolymers of this invention degrade at a slow steady rate after initially degrading at a fast rate due to the removal of unstable chain ends from the copolymer. The slow even rate characterizes the true nature of the copolymers and is described as the reaction rate constant. The copolymers of this invention exhibit a reaction rate constant for thermal degradation at 220° C. of 0.4 weight percent per minute, with the preferred products exhibiting a reaction rate constant of 0.2 weight percent per minute, or less. Thus, it is possible to process these copolymers without any stabilizing treatment such as by chain end-group "capping," and/or by incorporating stabilizing additives therewith. However, it is to be understood that these materials may be so treated, if desired, without departing from the intended scope of this invention.

The copolymer products of this invention may be used to prepare articles such as moldings, films, sheets, rods, tubes, fibers, filaments and the like by conventional molding, casting and/or extrusion processes such as are practiced at the present time. The finished articles exhibit generally excellent physical and chemical properties typical of articles fabricated from oxymethylene homopolymers. In processing, the copolymer products may be used unmodified or, if desired, may have incorporated therewith additives such as anti-oxidants, fillers, pigments, stabilizers, processing aids and the like which are oftentimes employed when processing such thermoplastic materials.

In order that those skilled in the art may more completely understand the present invention and the preferred methods by which the same may be carried into effect, the following specific examples are offered.

*Example 1*

A jacketed, one-liter, round bottom flask having a drainage stopcock with a ⅛-inch bore is fitted with an agitator, a thermocouple, a serum cap for injection of ingredients and with nitrogen inlet and outlet tubes. Through the stopcock, the flask is connected to a Sigma mixer of one liter capacity equipped with a thermocouple and nitrogen inlet and outlet valves. Each apparatus is heated to approximately 60° C. by circulating water through the jackets. The reactors are then purged with nitrogen and agitation is started, the paddles of the Sigma mixer being operated at 68 r.p.m. While continuing to maintain a slight positive nitrogen pressure through the system, 252 ml. of molten trioxane and 10.2 ml. of norbornadiene monomer are charged to each reactor. Employing a one-molar solution of boron trifluoride dibutyl etherate catalyst in cyclohexane 1.5 ml. of this solution is injected into the flask; 2.75 ml. of this solution is injected into the mixer. The catalyst level in the total reaction mixture is 0.656 millimol per mol of trioxane. In the reaction mixture contained in the Sigma mixer, initiation occurs 32 minutes after catalyst addition. The liquid reaction mixture in the flask is then transferred through the stopcock into the mixer, addition of this mixture being completed in about 60 minutes. While maintaining the temperature of the mixture at 58° to 62° C., the reaction is then continued for another hour, during which time the consistency of the reaction mixture gradually changes from that of a heavy suspension to a dry, predominantly granular product. Upon removal from the mixer, the product is washed successively with acetone, hot water and acetone and is finally dried at 50° C. under vacuum.

The finished copolymer product (obtained in approximately 80 percent yield) has an inherent viscosity of 1.33. It has a reaction rate constant for thermal degradation at 220° C. of 0.05 weight percent per minute, 85 percent of the copolymer remaining stable after initial degradation is completed. As determined by elemental carbon and hydrogen analysis, this copolymer product contains 1.38 mol percent of units derived from norbornadiene.

*Example 2*

To illustrate that copolymer products of higher average molecular weight are prepared by the process of this invention, a copolymer is prepared employing essentially the same polymerization recipe as outlined in Example 1, likewise in the absence of an organic liquid reaction medium. In this example, only the Sigma mixer is used as the reactor. It is maintained initially at 60° C. The total quantity of each monomer employed (504 ml. of molten trioxane; 20.4 ml. of norbornadiene) is charged to the mixer. Thereafter, 5.18 ml. of the boron trifluoride dibutyl etherate solution as used in Example 1 is injected into the mixer. The catalyst level is 0.796 millimol per mol of trioxane, and is significantly higher than the catalyst level employed in Example 1. Solid copolymer formation is first observed in the reaction mixture 98 minutes after addition of the catalyst. With initiation, the temperature of the mixture increases rapidly to 72° C. The reaction is then carried out for 90 minutes while continuously shearing and blending the mixture. During this time period, the mixture changes from an extremely heavy suspension to a dry, predominantly granular material. It is recovered, washed and dried as described in Example 1.

This copolymer which contains 1.11 mol percent of units derived from norbornadiene has a reaction rate constant for thermal degradation at 220° C. of 0.06 weight percent per minute, 80 percent of the copolymer remaining stable after the initial degradation period. However, the inherent viscosity of this copolymer is 0.95, whereas that of the copolymer product of Example 1 (which is prepared by the process of this invention) is 1.33.

It is to be noted that in a conventional process carried out in the absence of solvent, it is difficult to dissipate the heat developed during the process. In the process of this invention which likewise is conducted in the absence of solvent, there is no difficulty in controlling the reaction temperature within the narrow temperature range required.

*Example 3*

Following the general procedure as outlined in Example 1, a copolymer product of this invention is prepared in the presence of solvent (17 volume percent of the total reaction mixture). Each reactor is heated to approximately 60° C. and purged with nitrogen, after which each is charged with 255 ml. of trioxane, 10.2 ml. of norbornadiene and 54 ml. of anhydrous cyclohexane. While agitation in each reactor is continued, 2 ml. of the catalyst solution as described previously is injected into the flask and 5 ml. of this solution into the mixer, providing a catalyst level in the total reaction mixture of 1.08 millimols of catalyst per mol of trioxane. Copolymer formation is first observed in the reaction mixture within the mixer 32 minutes after catalyst addition. While transferring the reaction mixture from the flask into the mixer, the reaction mixture is maintained at 57° to 60° C. Addition of the second mixture is completed in 60 minutes, after which the reaction is continued for another hour with continuous shearing and blending of the reaction mixture. The product is recovered as a dry, predominantly granular material which is washed as described in Example 1. It is then finally dried under vacuum.

This copolymer product has an inherent viscosity of 1.38. It contains 1.32 mol percent of norbornadiene and has a reaction rate constant for thermal degradation at 220° C. of 0.07 weight percent per minute.

*Example 4*

For comparison purposes, a copolymer is prepared essentially as described in Example 2, employing only the Sigma mixer as the reactor. In this example, essentially the same polymerization recipe as used in Example 3 is employed, the entire quantity of each of the monomers and of solvent being charged to the Sigma mixer initially. In this example, 8.75 ml. of the catalyst solution as previously used is employed (a catalyst level of approximately 1.35 millimols per mol of trioxane), which level provides 25 percent more catalyst to the mixture than in Example 3. The initiation period in the reaction is completed 30 minutes after catalyst addition. The temperature of the reaction mixture is maintained at approximately 65° C. After initiation, the reaction is continued for an hour with shearing and blending of the reaction mixture. The dry copolymer product recovered has an inherent viscosity of 1.09 and a reaction rate constant for thermal degradation at 220° C. of 0.09 weight percent per minute.

It is to be understood that although the invention has been described with specific reference to particular embodiments thereof, it is not to be so limited, since changes and alterations therein may be made which are within the full intended scope of this invention as defined by the appended claims.

What is claimed is:

1. A reproducible process for preparing a thermally-stable oxymethylene copolymer composition from a mixture comprising a major amount of trioxane and a minor amount of a norbornadiene monomer having the structural formula

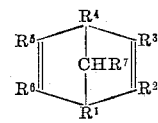

wherein $R^1$ to $R^7$ are each selected from the group consisting of hydrogen and lower alkyl radicals containing up to 4 carbon atoms with no more than one R being an alkyl radical, which process comprises charging to a high shear reactor the said monomeric mixture and a cationically-active polymerization catalyst; reacting, in an inert atmosphere and under substantially anhydrous conditions, the resultant reaction mixture with shearing and blending until copolymerization is initiated therein and the formation of insoluble copolymer is first observed; thereafter, while continuing shearing and blending of the first reaction mixture, adding thereto at a predetermined rate another mixture of the same reaction ingredients, which mixture is a liquid wherein copolymerization has not yet advanced to the formation of solid copolymer, whereby the addition of this mixture reduces initially the reaction rate in the first copolymerization mixture and then controls the over-all reaction rate thereof at a constant level; then continuing the shearing and blending of the copolymerization reaction mixture while the consistency thereof is transformed from a heavy suspension to a dry, predominantly granular material; and finally recovering a copolymer product having an inherent viscosity of at least 1.2, as determined at 60° C., employing a solution containing 0.5 g. of the copolymer product per 100 milliliters of solution, the solvent being p-chlorophenol containing 2 percent of alpha-pinene, by weight.

2. The process of claim 1 in which the copolymer product contains from 90 to 99.9 mol percent of recurring oxymethylene units and from 0.1 up to 10 mol percent of recurring units derived from the norbornadiene monomer.

3. The process of claim 2 in which the product comprises a copolymer of trioxane with norbornadiene having a reaction rate constant for thermal degradation at 220° C. of no more than 0.4 weight percent per minute.

4. The process of claim 2 in which the product comprises a copolymer of trioxane with 2-methyl norbornadiene having a reaction rate constant for thermal degradation at 220° C. of no more than 0.4 weight percent per minute.

5. The process of claim 1 in which the catalyst is selected from the group consisting of Lewis acids and coordination complexes of metal halides from organic compounds in which the donor atom is selected from the group consisting of oxygen, nitrogen and sulfur.

6. The process of claim 5 in which the catalyst is a boron trifluoride coordinate complex with an organic compound in which oxygen is the donor atom.

7. The process of claim 1 in which the catalyst is employed in an amount ranging from about 0.05 to about 10 millimols for each mol of trioxane.

8. The process of claim 1 which is conducted at a temperature ranging from 50° to 68° C. for a time period of 0.5 to 10 hours.

9. The process of claim 1 which is conducted at a temperature ranging from 60° to 68° C. for a time period of 1 to 5 hours.

10. The process of claim 1 which is conducted in the presence of up to 30 percent, by volume of the total reaction mixture, of an organic liquid reaction medium.

11. The process of claim 10 in which the organic liquid reaction medium is a cycloaliphatic hydrocarbon.

12. The process of claim 1 which is operated continuously.

References Cited

UNITED STATES PATENTS 3,252,818  5/1966  Seddon et al. _____ 259—9

WILLIAM H. SHORT, *Primary Examiner.*

L. M. PHYNES, *Assistant Examiner.*